United States Patent
Otomo et al.

(12) 
(10) Patent No.: US 9,421,627 B2
(45) Date of Patent: Aug. 23, 2016

(54) WIRE ELECTRIC DISCHARGE MACHINING APPARATUS

(71) Applicants: Yoichi Otomo, Chiyoda-ku (JP); Hideaki Kita, Chiyoda-ku (JP); Takashi Kakihana, Chiyoda-ku (JP)

(72) Inventors: Yoichi Otomo, Chiyoda-ku (JP); Hideaki Kita, Chiyoda-ku (JP); Takashi Kakihana, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 252 days.

(21) Appl. No.: 14/001,244

(22) PCT Filed: Oct. 30, 2012

(86) PCT No.: PCT/JP2012/078066
§ 371 (c)(1),
(2) Date: Aug. 23, 2013

(87) PCT Pub. No.: WO2014/068680
PCT Pub. Date: May 8, 2014

(65) Prior Publication Data
US 2015/0129558 A1    May 14, 2015

(51) Int. Cl.
*B23H 7/34* (2006.01)
*B23H 7/36* (2006.01)
*B23H 11/00* (2006.01)
*B23H 7/10* (2006.01)
(Continued)

(52) U.S. Cl.
CPC .. *B23H 7/34* (2013.01); *B23H 7/10* (2013.01); *B23H 7/36* (2013.01); *B23H 11/00* (2013.01); *B23H 11/003* (2013.01); *B23H 1/10* (2013.01); *B23H 7/02* (2013.01)

(58) Field of Classification Search
CPC .............. B23H 1/00; B23H 7/02; B23H 7/08; B23H 7/34; B23H 7/10; B23H 7/36; B23H 11/00; B23H 11/003
USPC ........................................... 219/69.12, 69.14
See application file for complete search history.

(56) References Cited

U.S. PATENT DOCUMENTS

| | | |
|---|---|---|
| 5,028,757 A | 7/1991 | Aramaki et al. |
| 5,111,016 A * | 5/1992 | Lodetti et al. .............. 219/69.12 |
| 5,196,666 A | 3/1993 | Hosaka |

(Continued)

FOREIGN PATENT DOCUMENTS

| | | |
|---|---|---|
| JP | 2-106224 A | 4/1990 |
| JP | 4-129614 A | 4/1992 |

(Continued)

OTHER PUBLICATIONS

International Search Report for PCT/JP2012/078066 dated Feb. 5, 2013.

*Primary Examiner* — Tu B Hoang
*Assistant Examiner* — Erin McGrath
(74) *Attorney, Agent, or Firm* — Sughrue Mion, PLLC

(57) ABSTRACT

A wire electric discharge machining apparatus that machines a workpiece by using a wire supported between a lower arm and an upper arm. The apparatus includes a surface plate that has a vacant inner area in which the wire moves and supports part of the workpiece with an outer area thereof. The apparatus further includes a bellows that extends through a side surface of a casing of a machining bath, enclosing part of the lower arm, wherein a first end of the bellows that is on a side of the machining bath is attached to the lower arm so that the bellows does not get in under the inner area, at whatever position the wire machines the workpiece.

7 Claims, 6 Drawing Sheets

(51) Int. Cl.
*B23H 7/02* (2006.01)
*B23H 1/10* (2006.01)

(56) References Cited

U.S. PATENT DOCUMENTS

| | | | | |
|---|---|---|---|---|
| 5,243,165 A | * | 9/1993 | Hosaka | B23H 7/02 |
| | | | | 219/69.12 |
| 5,401,931 A | | 3/1995 | Hori | |
| 6,008,461 A | * | 12/1999 | Iezawa | B23H 1/02 |
| | | | | 219/69.12 |
| 6,486,429 B1 | | 11/2002 | Wehrli et al. | |
| 7,973,260 B2 | * | 7/2011 | Luo et al. | 219/69.12 |

FOREIGN PATENT DOCUMENTS

| | | |
|---|---|---|
| JP | 4-146025 A | 5/1992 |
| JP | 6-55349 A | 3/1994 |
| JP | 10-296543 A | 11/1998 |
| JP | 2001-54822 A | 2/2001 |
| JP | 2001-300820 A | 10/2001 |
| JP | 2006-130597 A | 5/2006 |

* cited by examiner

WIRE ELECTRIC DISCHARGE MACHINING APPARATUS

CROSS REFERENCE TO RELATED APPLICATIONS

This application is a National Stage of International Application No. PCT/JP2012/078066 filed Oct. 30, 2012.

FIELD

The present invention relates to a wire electric discharge machining apparatus that machines a workpiece by electric discharge generated between a wire travelling in a machining liquid and the workpiece.

BACKGROUND

In wire electric discharge machining apparatuses, a wire is supported by a lower arm and an upper arm. With the lower arm enclosed in a bellows being inserted in a machining bath, the lower arm and the upper arm are moved. Thus, the wire moves in a machining liquid, so that a workpiece is machined.

In such a wire electric discharge machining apparatus, one end of the bellows is fixed to a seal plate (shield plate) outside the machining bath so that the machining liquid does not leak through the place where the lower arm is inserted in the machining bath. Further, the machining liquid having leaked through the area adjacent to the seal plate is retrieved by a retrieving tub (refer to, e.g., Patent Literature 1).

CITATION LIST

Patent Literature

Patent Literature 1: Japanese Patent Application Laid-open Publication No. 2006-130597

SUMMARY

Technical Problem

However, with the above conventional art, because the bellows is partly exposed from under a surface plate supporting a workpiece in the machining bath, there is the problem that if the workpiece falls off the surface plate due to a user's operation mistake or the like, the workpiece may damage the bellows.

The present invention was made in view of the above fact, and an object thereof is to provide a wire electric discharge machining apparatus which prevents damage to the bellows.

Solution to Problem

The present invention is directed to a wire electric discharge machining apparatus that achieves the object. The wire electric discharge machining apparatus machines a workpiece by using a wire supported between a lower arm and an upper arm, and includes a surface plate, having a vacant inner area, for placing the workpiece thereon by supporting part of the workpiece with an outer area thereof, wherein the wire moves in the inner area; a machining bath having a casing for holding a machining liquid for placing the surface plate in the casing, wherein the casing is supplied with the machining liquid to a position for machining the workpiece, wherein the lower arm extends through a side surface of the casing, and wherein by moving a horizontal relative position between the lower and upper arms and the casing, a horizontal relative position between the wire and the workpiece is moved; and a bellows extending through the side surface and enclosing part of the lower arm, wherein a first end of the bellows that is on a side of the machining bath is attached to the lower arm so that the bellows does not get in under the inner area, at whatever position the wire machines the workpiece.

Advantageous Effects of Invention

The present invention has the effect of enabling the prevention of damage to the bellows.

BRIEF DESCRIPTION OF DRAWINGS

FIG. 2-1 is a diagram for explaining the configuration of an elongate hole.

FIG. 2-2 is a diagram for explaining the configuration of a seal plate.

DESCRIPTION OF EMBODIMENTS

A wire electric discharge machining apparatus according to an embodiment of the present invention will be described in detail below with reference to the drawings. Note that this embodiment is not intended to limit the present invention.

Figure 1:
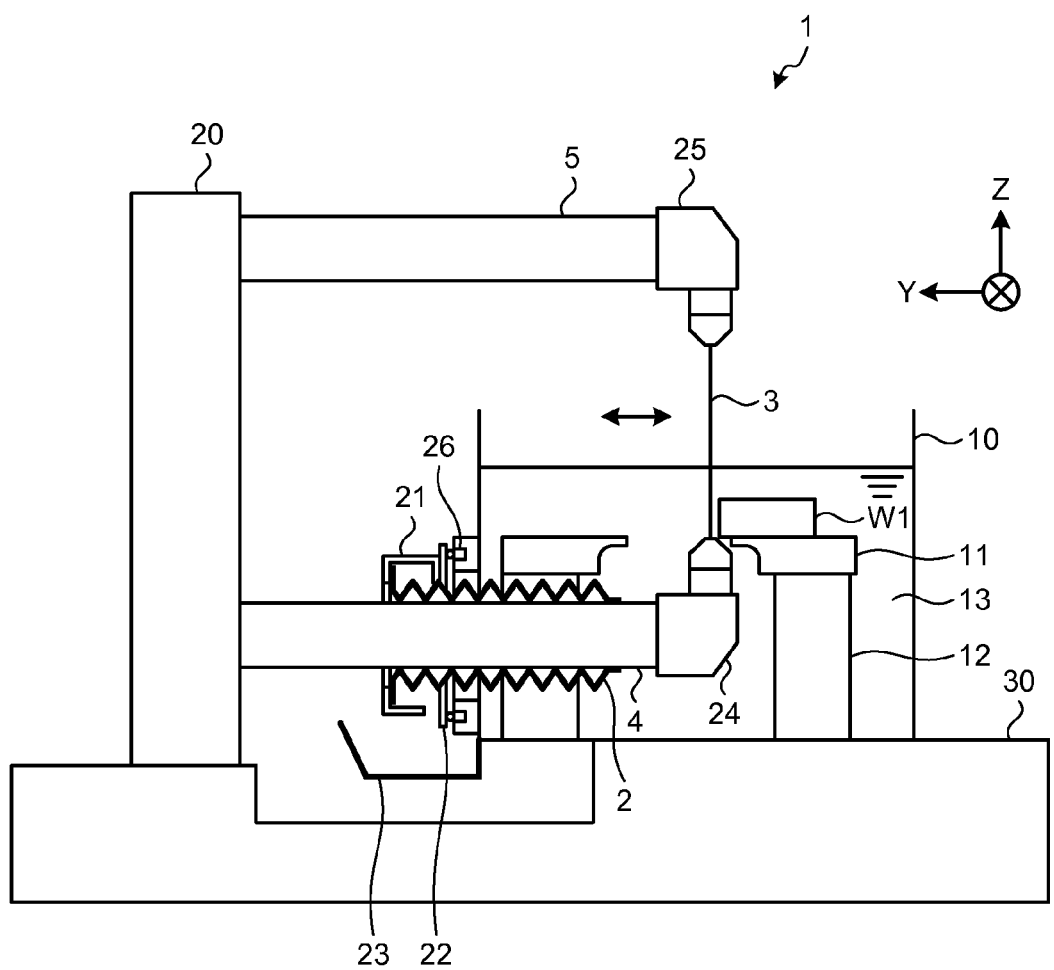
FIG. 1 is a diagram showing the configuration of a wire electric discharge machining apparatus according to an embodiment of the present invention.

Embodiment:

FIG. 1 is a diagram showing the configuration of a wire electric discharge machining apparatus according to the embodiment of the present invention. A wire electric discharge machining apparatus 1 is an apparatus which machines a workpiece by electric discharge generated between the workpiece and a wire supported between a lower arm and an upper arm. The wire electric discharge machining apparatus 1 has a support base 30 and comprises a machining bath 10 and a column 20 on the support base 30.

A lower arm 4 extending horizontally is provided on the lower side of the column 20, and an upper arm 5 extending horizontally is provided on the upper side of the column 20. The lower arm 4 and the upper arm 5 are placed such that their axis directions are parallel to each other.

A lower guide 24 is provided at the tip (the opposite end from the column 20) of the lower arm 4, and an upper guide 25 is provided at the tip (the opposite end from the column 20) of the upper arm 5. A wire (wire electrode) 3 extending vertically is held by the lower guide 24 and the upper guide 25 between the lower arm 4 and the upper arm 5.

A surface plate support 12 and a surface plate 11 are placed in the machining bath 10. The surface plate support 12 extends vertically from the bottom of the machining bath 10, and the surface plate 11 is placed on its end (upper end).

The surface plate 11 is a mount on which to place a workpiece W1 as an object subject to machining. The surface plate 11 has a vacant inner area and is formed such that the workpiece W1 is to be placed thereon with part of the workpiece W1 being supported by its outer area and that the wire 3 can move in the inner area.

The surface plate 11 is formed of, e.g., a flat-plate shaped, annular member or the like. The inner area (inward of the annular member) surrounded by the inner edge of the surface plate 11 is the area where the workpiece W1 can be machined (hereinafter called a surface plate inner area), and the wire 3 moves in the surface plate inner area. When machining the workpiece W1, the workpiece W1 is placed on the surface plate 11 such that a portion to be machined is located within the surface plate inner area.

The machining bath 10 contains a machining liquid 13 so that the workpiece W1 placed on the surface plate 11 is immersed in the machining liquid 13. For example, the machining bath 10 contains enough of the machining liquid 13 that at least part of the wire 3 to machine the workpiece W1 with, the workpiece W1, the surface plate support 12, the surface plate 11, the lower arm 4, and the lower guide 24 are immersed in the machining liquid 13.

A through hole (an elongate hole 27 described later) to insert the lower arm 4 in is provided at a side surface of the machining bath 10. The lower arm 4 extends from the column 20 through the elongate hole 27 provided in the machining bath 10 into the machining bath 10.

In the machining bath 10, by moving the horizontal relative positions between the lower and upper arms 4, 5 and the machining bath 10, the horizontal relative position between the wire 3 and the workpiece W1 is moved.

Part of the portion of the lower arm 4 inserted into the machining bath 10 and part of the portion of the lower arm 4 not inserted in the machining bath 10 are enclosed in bellows 2. A seal plate 22 and a gasket 26 are provided adjacent to the elongate hole 27 provided in the machining bath 10 and further out than the side surface of the machining bath 10 (on the column 20 side), and the seal plate 22 seals against the side surface of the machining bath 10 via the gasket 26 in an airtight manner.

A flange (housing) 21 to house the bellows 2 when the bellows 2 is contracted is provided on the outside of the machining bath 10 (on the column 20 side of the seal plate 22). The flange 21 is detachably attached to the seal plate 22 in an airtight manner.

The flange 21 is formed of, e.g., a cylindrical member. The flange 21 has a shield plate (the bottom of the cylindrical member) (a first shield) that extends in a direction perpendicular to the axis direction of the lower arm 4 and that blocks droplets of the machining liquid 13 flying in the axis direction of the lower arm 4. The end on the column 20 side of the bellows 2 is fixed to the shield plate.

The bellows 2 is fixed at one end (a first end) to the portion of the lower arm 4 inserted in the machining bath 10, and the other end (a second end) is fixed to the inside of the flange 21. With this configuration, the bellows 2 enclosing a portion of the lower arm 4 extends through the flange 21, the seal plate 22, and the elongate hole 27 (in the side surface of the machining bath) in that order when going from the column 20 toward the machining bath 10.

When machining the workpiece W1 with use of the wire 3, the column 20 moves horizontally (in X- and Y-directions) relative to the machining bath 10. By this means, the wire 3 moves in X- and Y-directions relative to the machining bath 10. When machining the workpiece W1, the column 20 may move on the support base 30, or the machining bath 10 may move on the support base 30.

When the column 20 approaches the machining bath 10 (when the wire 3 moves into the right side of the surface plate inner area in FIG. 1), the bellows 2 stretches into the machining bath 10. The bellows 2 of the present embodiment is fixed at an end to the lower arm 4 so that the bellows 2 does not get in under the surface plate inner area, to whatever position the wire 3 moves in the surface plate inner area. In other words, the bellows 2 is fixed at an end to the lower arm 4 so that the bellows 2 does not get in the surface plate inner area when seeing the surface plate 11 from above (in a Z-axis direction). As such, the bellows 2 is fixed at an end to the lower arm 4 so that even if the column 20 comes the closest to the machining bath 10, the bellows 2 extends only to a position under the surface plate 11.

When the column 20 moves away from the machining bath 10 (when the wire 3 moves into the left side of the surface plate inner area in FIG. 1), the bellows 2 contracts toward the column 20, and the left side portion of the bellows 2 is housed in the flange 21.

In the wire electric discharge machining apparatus 1, a retrieving tub (gutter) 23 is placed under the seal plate 22 and the flange 21. The machining liquid 13 may leak through the area adjacent to the seal plate 22. The machining liquid 13 having leaked flows into the retrieving tub 23 and is retrieved with the retrieving tub 23. The machining liquid 13 retrieved with the retrieving tub 23 is returned to a machining liquid tank (not shown).

As such, by displacing the surface (position) at which to attach the lower arm 4 to the bellows 2 to the back side (proximal side) of the lower arm 4, the wire electric discharge machining apparatus 1 of the present embodiment is configured such that the bellows 2 is not exposed from under the surface plate 11 at all.

Figures 1, 2:
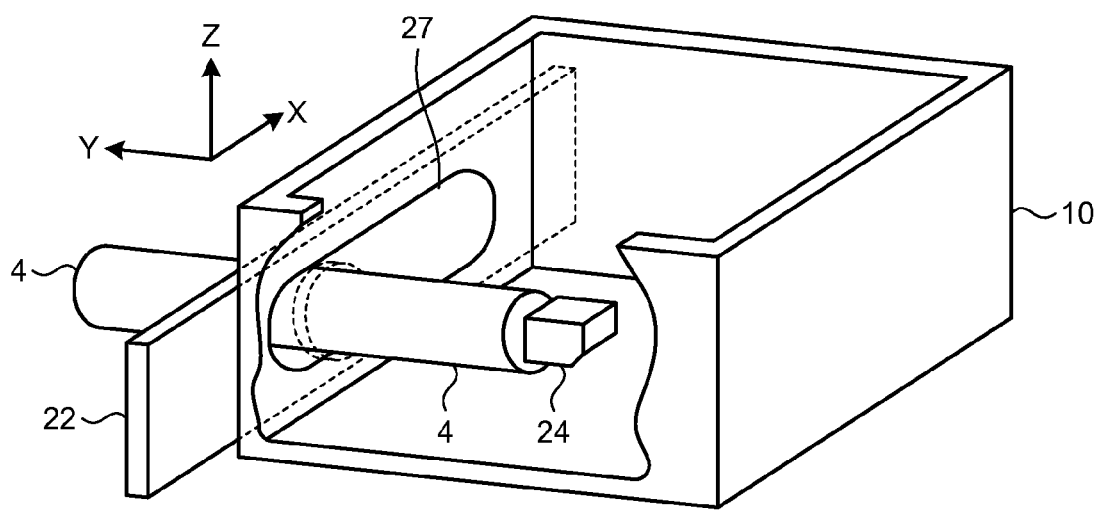
Figure 2:
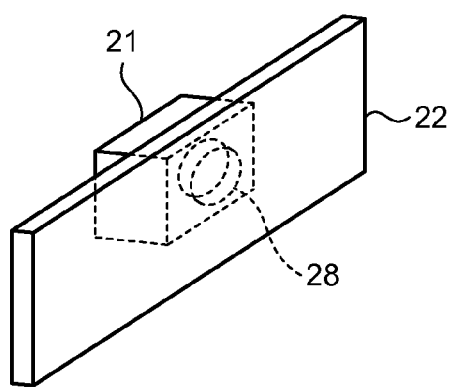

Next, the configuration of the seal plate 22 and the flange 21 will be described. FIG. 2-1 is a diagram for explaining the configuration of the elongate hole, and FIG. 2-2 is a diagram for explaining the configuration of the seal plate. In FIG. 2-1, the flange 21, the bellows 2, the gasket 26, and so on are omitted from being shown.

An opening 28 is provided in the seal plate 22 that prevents leakage of the machining liquid 13 through the elongate hole 27 so that the lower arm 4 can move in a Y-direction (an axis direction of the lower arm 4). The elongate hole 27 is provided in a side surface of the machining bath 10 so that the lower arm 4 can move in X- and Y-directions.

The lower arm 4 extends through the opening 28 and the elongate hole 27 with a portion thereof being in the machining bath 10 and the rest being outside the machining bath 10. The seal plate 22 is attached to the side surface of the machining bath 10 such that the seal plate 22 is movable in a plane parallel to the side surface of the machining bath 10 with blocking the elongate hole 27 except for its part corresponding to the opening 28.

As the column 20 moves in a Y-axis direction, the lower arm 4 moves in the machining bath 10, and thus the bellows 2 stretches and contracts. By this means, the machining bath 10 is sealed without the machining liquid 13 leaking.

Because the wire electric discharge machining apparatus 1 is provided with the flange 21, the bellows 2 can be displaced toward the column 20. By this means, the bellows 2 can be placed such that even if the lower arm 4 moves over a full stroke in a Y-axis direction, the bellows 2 is not exposed from under the surface plate 11 at all.

Figure 3:
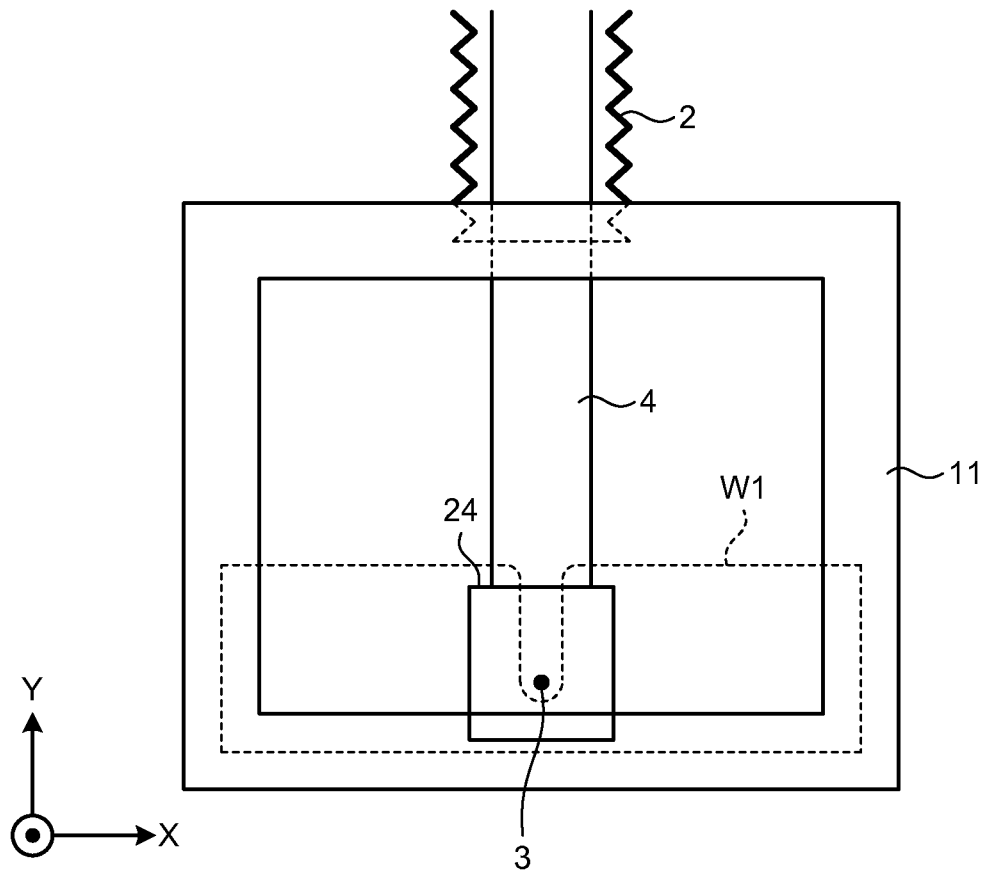
FIG. 3 is a diagram for explaining the relation between the movement position of a bellows and a surface plate inner area.

Here, the relation between the movement position of the bellows 2 and the surface plate inner area will be described. FIG. 3 is a diagram for explaining the relation between the movement position of the bellows and the surface plate inner area. FIG. 3 shows a top view of the surface plate 11. When machining the workpiece W1, the lower arm 4 moves in the surface plate inner area, and thus the wire 3 moves in the surface plate inner area to machine the workpiece W1.

In the present embodiment, an end of the bellows 2 is joined to the lower arm 4 so that even if the bellows 2 is stretched furthest (when machining at a machining position the farthest from the seal plate 22), the bellows 2 does not get in the surface plate inner area. In other words, the bellows 2 of the present embodiment is fixed to the lower arm 4 so that the bellows 2 does not get in under the surface plate inner area, at whatever position the wire 3 machines the workpiece W1.

Specifically, the end on the machining bath 10 side of the bellows 2 is fixed, at a position a predetermined distance away from the end on the machining bath 10 side of the lower arm 4, to the lower arm 4. The predetermined distance is such a distance that, e.g., the Y-direction distance from the wire 3 to the bellows 2 is longer than the Y-direction distance of the surface plate inner area. This means can prevent damage to the bellows 2 due to the fall of the workpiece W1.

Conventionally, the bellows is fixed to the seal plate, and hence if the bellows is damaged due to abrasion by sludge or the like, the machining liquid may be scattered over areas around the bellows. In this case, there is the problem that the machining liquid directly comes into contact with an area (the floor, a bed cast structure, or the like) other than the retrieving area for the machining liquid, or so on. Meanwhile, the present embodiment can prevent damage to the bellows 2, thus preventing the scattering of the machining liquid 13 or so on.

Figure 4:
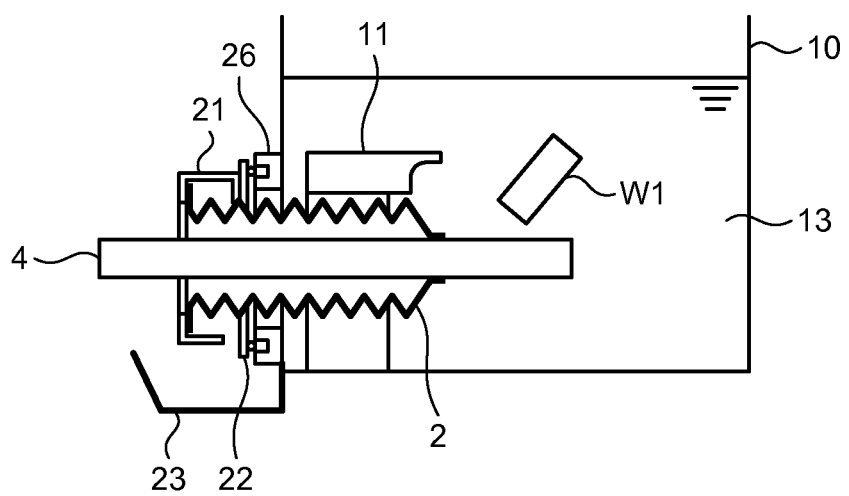
FIG. 4 is a diagram for explaining the relation between the position where a workpiece has fallen and the position of the bellows.

FIG. 4 is a diagram for explaining the relation between the position where the workpiece has fallen and the position of the bellows. If the workpiece W1 falls onto the lower arm 4 due to a user's mistake, the workpiece W1 will not fall onto the bellows 2 because the bellows 2 does not extend into the surface plate inner area. Thus, a lower arm-bellows structure and a machining bath sealing structure of high reliability preventing damage to the bellows 2 can be realized.

The conventional structure is one where the bellows cannot be removed without removing the lower arm. Hence, if the bellows needs to be replaced because of being damaged or so on, the lower arm needs to be temporarily removed from the column, resulting in the replacement of the bellows being a heavy workload.

In the present embodiment, since the bellows 2 is provided in the machining bath 10, when replacing the bellows 2 because of deterioration over time or the like, the bellows 2 can be easily removed from the inside of the machining bath 10 after the lower guide 24 and the flange 21 are removed.

When replacing the bellows 2, after the old bellows 2 is removed from the lower arm 4 by the following process of (A1) to (A4), a new bellows 2 is attached to the lower arm 4 by the following process of (B1) to (B4).

The removal of the bellows 2 from the lower arm 4 is performed according to, e.g., the following procedure of (A1) to (A4).

(A1) Remove the lower guide 24 from the lower arm 4.
(A2) Remove the flange 21 from the seal plate 22 so that the root of the bellows 2 can be seen.
(A3) Remove the bellows 2 from the flange 21.
(A4) Pull the bellows 2 out from the direction of the machining bath 10, thereby removing the bellows 2 from the lower arm 4.

The attachment of the bellows 2 to the lower arm 4 is performed according to, e.g., the following procedure of (B1) to (B4).

(B1) Put in the bellows 2 around the lower arm 4 from the direction of the machining bath 10.
(B2) Attach the lower guide 24 to the lower arm 4.
(B3) Attach the bellows 2 to the flange 21.
(B4) Attach the flange 21 to the seal plate 22.

As such, in the present embodiment, the bellows 2 is fixed to the flange 21, and thus the removal of the bellows 2 from the seal plate 22 becomes easy. Further, the bellows 2 need only be fixed to the flange 21, and thus the attachment of the bellows 2 becomes easy. Thus, the replacement of the bellows 2 becomes easy.

Figure 5:
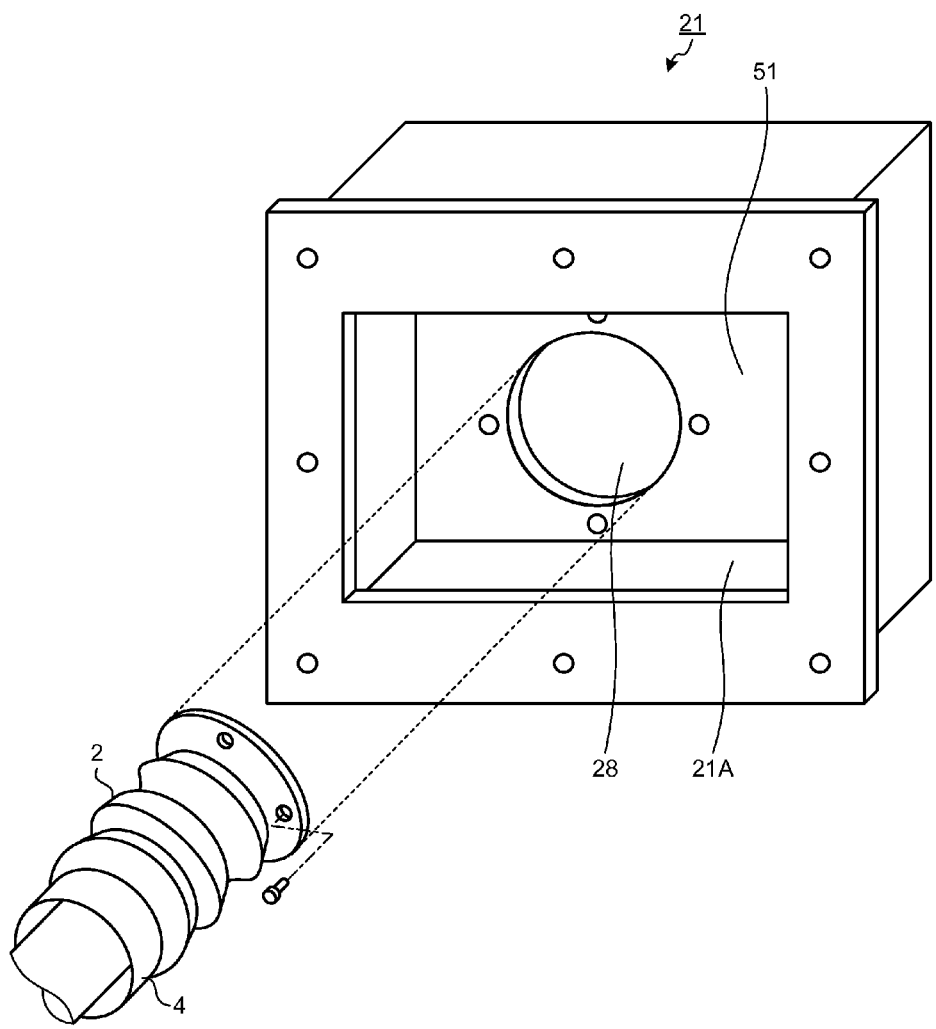
FIG. 5 is a diagram showing an example configuration of a flange.

Next, an example configuration of the flange 21 will be described. FIG. 5 is a diagram showing an example configuration of the flange. The flange 21 has a side wall 21A that is a bottomed cylindrical casing. The flange 21 further has a shield (first shield) 51 placed at its bottom, perpendicular to the side wall 21A. Further, the opening 28 for the lower arm 4 to extend through is provided in the shield 51 of the flange 21. The bellows 2 is attached to the flange 21 so that the lower arm 4 is surrounded by the side wall 21A and extends through the opening 28. Thus, if the bellows 2 is damaged due to deterioration, with the configuration described below, the scattering of the machining liquid 13 can be prevented.

Figure 6:
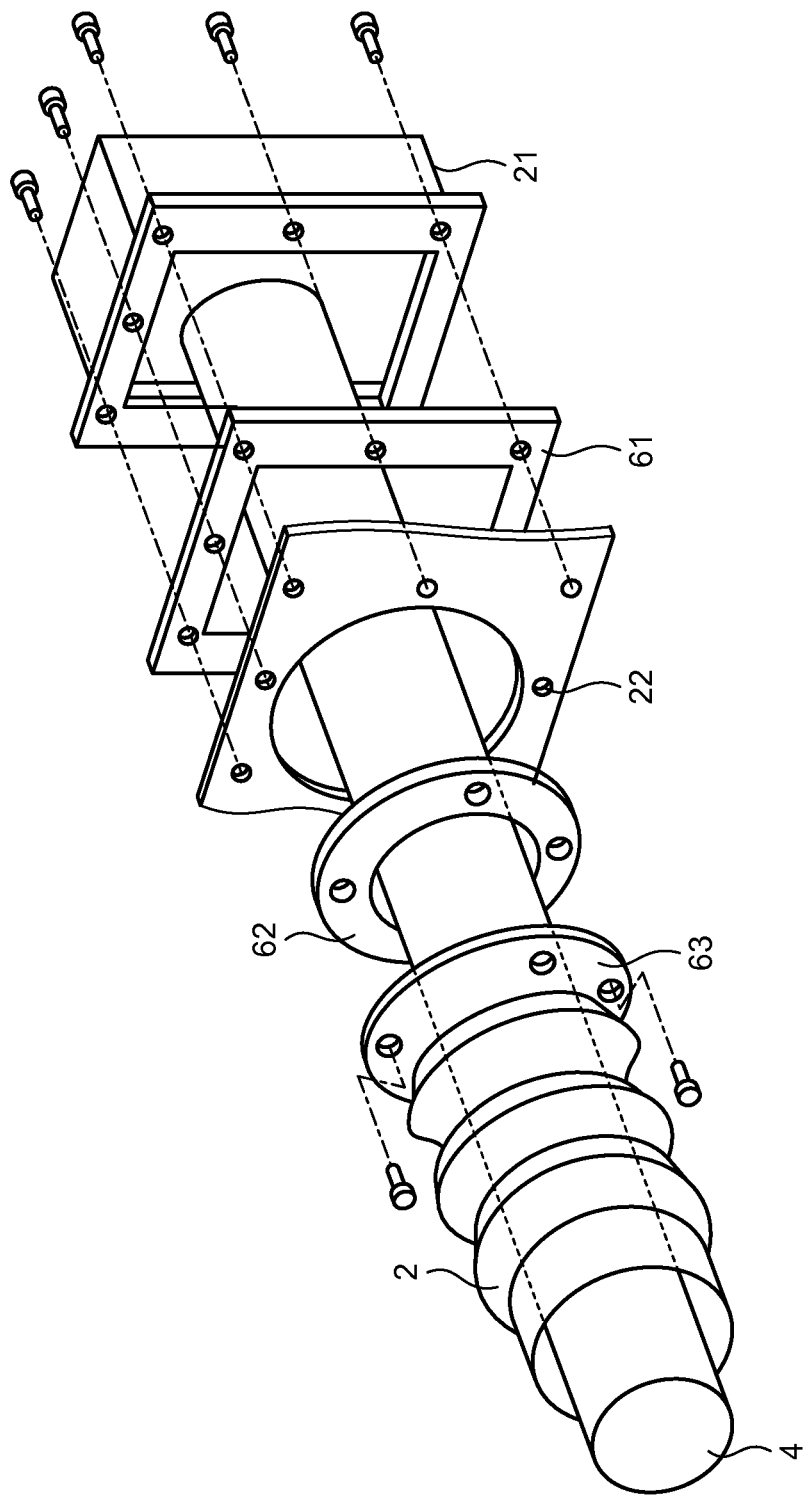
FIG. 6 is a diagram for explaining the configuration of the connection portion of the bellows and the flange.

Next, the configuration of the connection portion of the bellows 2 and the flange 21 will be described. FIG. 6 is a diagram for explaining the configuration of the connection portion of the bellows 2 and the flange 21. The bellows 2 is attached to the lower arm 4 so as to enclose the lower arm 4. At this time, the bellows 2 is attached to the lower arm 4 with the periphery of the bellows 2 being fastened by hose binding.

An attachment 63 is provided at an end of the bellows 2 (on the flange 21 side), and the attachment 63 is attached to the shield 51 via a gasket 62. Further, the seal plate 22 is attached to the side wall 21A of the flange 21 via a gasket 61. The attachment 63, the gasket 62, and the side wall 21A are connected with use of, e.g., screws or the like. The seal plate 22, the gasket 61, and the flange 21 are connected with use of, e.g., screws or the like.

Note that if the bellows 2 can be stretched and contracted to desired lengths, the flange 21 does not need to be provided. For example, if the stroke of the lower arm 4 is small or the material of the bellows 2 is thin, the flange 21 does not need to be provided.

Figure 7:
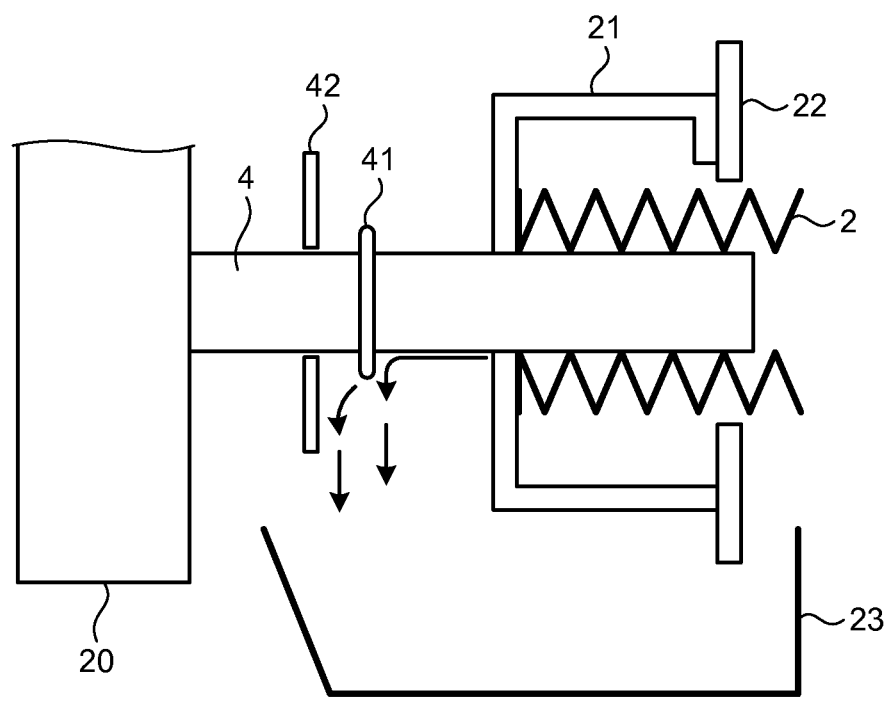
FIG. 7 is a diagram showing the configuration of a lower arm having a scattering preventing member.

Further, a scattering preventing member (second shield) for preventing the scattering of the machining liquid 13 may be placed on the lower arm 4. FIG. 7 is a diagram showing the configuration of a lower arm having a scattering preventing member. The scattering preventing member is placed between the opposite end of the lower arm 4 from the machining bath 10 and the flange 21. The scattering preventing member extends perpendicular to the axis direction of the lower arm 4 to block droplets of the machining liquid flying in the axis direction of the lower arm 4. In the present embodiment, the case where the scattering preventing member includes scattering preventing members 41, 42 will be described.

The scattering preventing member 41 is, for example, an annular member attached to the lower arm 4. The scattering preventing member 41 is formed of, e.g., a plate-shaped member and attached to the lower arm 4 such that the lower arm 4 extends through the opening of the scattering preventing member 41. The scattering preventing member 41 may be formed integrally with the lower arm 4 or may be formed separately from the lower arm 4 to be attachable to and detachable from the lower arm 4.

If the bellows 2 is damaged, the machining liquid 13 gets in between the bellows 2 and the lower arm 4. With the scattering preventing member 41 placed, if the bellows 2 is damaged due to deterioration, droplets of the machining liquid 13 flying from the direction of the lower arm 4 or the inside of the flange 21 can be blocked by the scattering preventing member 41. Note that the scattering preventing member 41 is placed at such a position that the member does not come into contact with the flange 21 even if the bellows 2 is contracted most.

Further, the scattering preventing member 42 separate from the lower arm 4 may be placed in the wire electric discharge machining apparatus 1. The scattering preventing member 42 is attached to, e.g., a member other than the lower arm 4, and the lower arm 4 extends through. In other words, the scattering preventing member 42 is an annular member (e.g., a plate-shaped member) having an opening for the lower arm 4 to extend through. The scattering preventing member 42 is attached near the periphery of the lower arm 4 such that the lower arm 4 is movable through the opening of the scattering preventing member 42. The position of the scattering preventing member 42 is fixed regardless of the movement of the lower arm 4.

With the scattering preventing member 42 placed, droplets of the machining liquid 13 flying from the inside of the flange 21 can be blocked by the scattering preventing member 42. Note that the scattering preventing member 42 is placed at such a position that the member does not come into contact with the flange 21 even if the bellows 2 is contracted most. Where both the scattering preventing members 41, 42 are placed in the wire electric discharge machining apparatus 1, the scattering preventing members 41, 42 are placed at such positions that the scattering preventing member 41 does not come into contact with the flange 21 and the scattering preventing member 42 even if the bellows 2 is contracted most. The retrieving tub 23 is placed at such a position that it can retrieve the machining liquid 13 having flowed off the scattering preventing member 41, 42 and the neighborhood of the seal plate 22.

As such, according to the present embodiment, one end of the bellows 2 is attached to the lower arm 4 so that the bellows 2 does not get in the surface plate inner area, and hence damage to the bellows 2 can be prevented.

Further, because the other end of the bellows 2 is attached to the flange 21, the bellows 2 can be housed in the flange 21, and thus the stretching and contracting area of the bellows 2 can be enlarged. Therefore, with one end of the bellows 2 being attached to the lower arm 4, damage to the bellows 2 can be prevented, while the bellows 2 can be stretched and contracted to desired positions.

Further, because the shield 51 is provided in the flange 21, the scattering of the machining liquid 13 from the bellows 2 can be prevented. Yet further, because the scattering preventing member 41, 42 are placed, the scattering of the machining liquid 13 can be prevented.

INDUSTRIAL APPLICABILITY

As described above, the wire electric discharge machining apparatus 1 according to this invention is suitable for machining a workpiece by electric discharge generated between a wire travelling in a machining liquid and the workpiece.

REFERENCE SIGNS LIST

1 Wire electric discharge machining apparatus
2 Bellows
3 Wire
4 Lower arm
5 Upper arm
10 Machining bath
11 Surface plate
13 Machining liquid
20 Column
21 Flange
22 Seal plate
23 Retrieving tub
41, 42 Scattering preventing member
51 Shield
W1 Workpiece

The invention claimed is:

1. A wire electric discharge machining apparatus comprising:
   a lower arm and an upper arm, which support a wire therebetween and move to machining positions in parallel to a first direction, for the wire to machine a workpiece;
   a surface plate having a vacant inner area, for placing the workpiece thereon by supporting a part of the workpiece with an outer area which surrounds the vacant inner area, wherein the wire moves in the vacant inner area while machining the workpiece;
   a machining bath having a casing which holds a machining liquid, into which the surface plate is placed, and has a side surface through which the lower arm extends, wherein by moving a horizontal relative position between the lower and upper arms and the casing in the first direction, a horizontal relative position between the wire and the workpiece is changed; and
   a bellows which extends through the side surface of the casing and encloses a part of the lower arm,
   wherein the casing is supplied with the machining liquid so that a machining position at which the wire machines the workpiece, among the machining positions, is immersed in the machining liquid,
   a first end of the bellows, that is inside the machining bath, is attached to the lower arm so that the bellows does not move underneath the vacant inner area, regardless of the machining position to which the upper and lower arms move the wire within the vacant inner area,
   the upper and lower arms are attached to a column which extends perpendicular to the first direction and is configured to move together with the upper and lower arms,
   a distance between the first end of the bellows and the wire is greater than a distance between sides of the vacant inner area which oppose one another in the first direction, and
   the first direction is coincident with an axial direction of the lower arm, and is a direction to move the wire orthogonally away from the side surface of the casing.

2. The wire electric discharge machining apparatus according to claim 1, further comprising:
   a housing which is attached to an outside of the machining bath and houses the bellows when the bellows is contracted,
   wherein a second end of the bellows, that is disposed on an opposite side of the machining bath, is attached to the housing.

3. The wire electric discharge machining apparatus according to claim 2, wherein the housing has a first shield extending perpendicular to an axial direction of the lower arm to block the machining liquid flying in the axial direction of the lower arm, and
   the second end of the bellows is attached to the first shield.

4. The wire electric discharge machining apparatus according to claim 1, further comprising:
- a second shield which is placed between an end of the lower arm opposite to the machining bath and extends perpendicular to the axial direction of the lower arm for blocking the machining liquid flying in the axial direction of the lower arm.

5. The wire electric discharge machining apparatus according to claim 4, wherein the second shield is an annular member attached to the lower arm.

6. The wire electric discharge machining apparatus according to claim 4, wherein the second shield is attached to a member other than the lower arm, and
- wherein the lower arm extends through the second shield.

7. The wire electric discharge machining apparatus according to claim 1, wherein the bellows does not move underneath the vacant inner area even when an end of the lower arm which supports the wire moves to the machining position within the vacant inner area which is furthest away from the side surface of the casing.

\* \* \* \* \*